United States Patent Office 3,312,735
Patented Apr. 4, 1967

3,312,735
PURIFICATION OF ETHYLENESULFONIC ACID
Robert C. Medford, Grafton, and Charles R. Pfeifer, Newport News, Va., assignors to The Dow Chemical Company, Midland, Mich., a corporation of Delaware
No Drawing. Filed Sept. 30, 1963, Ser. No. 312,298
3 Claims. (Cl. 260—513)

This invention relates to a method for preparing ethylenesulfonic acid in a high state of purity, which, in some respects, could be referred to as a stabilization of ethylenesulfonic acid.

Ethylenesulfonic acid (which will hereinafter be referred to as ESA) or as it is frequently referred to, vinyl sulfonic acid, is by no means a new compound and although it has good potential for and has been used to some extent in various applications, principally in the formation of polymers for such uses as ion exchange resins and textile fibers, e.g., as a copolymer with acrylonitrile, yet it has not been widely employed. This is because, principally, it is apparently quite unstable such that when it is exposed to air it begins to discolor in 10 to 15 minutes until after an hour it is usually observed to be tending towards a dark red color which is frequently coupled with partial premature polymerization of the ESA. ESA in its normal state is a hydroscopic, colorless, transparent and viscous liquid. The obvious disadvantages of having to cope with such a delicate compound and its associated discoloration can well be appreciated, especially when it is being employed in the preparation of fiber-forming polymers, an art where coloration or the absence of it is particularly critical.

The principal means that has been employed to purify ESA is vacuum distillation as discussed in such references as Kohler, Journal of the American Chemical Society, vol. 17, page 728 (1897) and vol. 20, page 680 (1898); Breslow, Hough, Fairclough, Journal of The American Chemical Society, vol 76, page 5361 (1954); Breslow and Hulse, Journal of The American Cehmical Society, vol. 76, page 6399 (1954); Eisenberg and Mohan, Journal of Physical Chemistry, vol. 63, page 671 (1959). Notable improvements in the purity of the ESA are observed after vacuum distillation thereof, however, the apparently inherent tendency to discolor after short exposure to air remains. It is reported in the Journal of the Chemical Society, Japan, Industrial Chemical Section, vol. 64, pages 929–932 (1961) that discoloration and partial polymerization of the ESA can be minimized by maintaining a nitrogen atmosphere (a nitrogen current) over the ESA in a cool, dark place. No successful work is known to be reported on the use of suitable stabilizers, but even if improved results are obtained, the presence of such stabilizers is often confounding when the mixture is employed in certain end uses.

It is the object of this invention to provide a means for preparing ESA in a state of high purity or stability such that it will remain colorless over an extended period of time even when exposed to air.

The foregoing and additional objects and associated benefits and advantages are achieved in and by the present invention wherein ethylenesulfonic acid in its crude or manufactured state, or from any source for that matter, is first intimately contacted with activated carbon or charcoal and separated therefrom, and then distilled under reduced pressure.

Among the surprising and unexpected features and criticalities of the present method are that the results that are obtained by the sequence of treatments of the invention, i.e., the resistance to discoloration, are far and above any improvements that are obtained by treating the ESA with activated charcoal alone, or vacuum distilling the ESA alone, no matter how many times the activated charcoal treatment or vacuum distilling is repeated on the ESA. Additionally, and of paramount importance is the anomalous fact that if the reverse treatment is employed, i.e., vacuum distilling followed by treatment with activated charcoal, results are observed no better than when either one of the treatments singly are given the ESA. Thus by way of example, one of the pondersome difficulties that has been overcome with the present invention, in addition to the prevention of discoloration, was the inability to copolymerize ESA with acrylonitrile without seriously reducing both rate of polymerization and product molecular weight as compared with polymerization rates and product molecular weights obtained in the homopolymerization of acrylonitrile under the same conditions. The greater the ratio of ESA to acrylonitrile, the greater was the diminshing of polymerization rate and molecular weight of the resultant polymer. In contrast, when ESA treated according to the present invention is employed for copolymerization with acrylonitrile, essentially no changes are observed in polymerization rate and polymer molecular weight when compared with acrylonitrile homopolymerization.

The following examples will serve to further illustrate and point out the features of the invention wherein, unless otherwise specified, all parts and percentages are by weight.

Example I

Crude ethylenesulfonic acid was prepared according to the method of Breslow et al.[1] involving the conversion of ethanol to ethionic acid with sulfur trioxide and sulfur dioxide, the conversion of ethionic acid to sodium ethylenesulfonate with sodium hydroxide, the conversion of sodium ethylenesulfonate to ethylenesulfonic acid with mineral acid, and flash distillation of the ethylenesulfonic acid.

The ethylenesulfonic acid obtained by this procedure was light brown in color and darkened on standing. Analysis of this material was as follows:

Percent purity by titration with base _____ 72.0
Percent purity by bromination of olefinic linkage _____ 72.4
Density (26.5° C.) _____ 1.3115
$n_D^{25}$ _____ 1.4325

This material was copolymerized with acrylonitrile at 60° centigrade in a 60% solution of zinc chloride in water using hydrogen peroxide catalyst as follows.

A solution was made up of 60 parts zinc chloride to 40 parts ion-free water. The acidity of this solution was adjusted by addition of concentrated hydrochloric acid so that when a portion of this solution was diluted with distilled water to ten times its volume it had a pH of 3.0.

To 87 parts of the 60% zinc chloride solution was added 10.6 parts of acrylonitrile, 1.9 parts of the above crude ethylenesulfonic acid, 0.71 part zinc oxide, and 0.025 part hydrogen peroxide. The solution was stirred vigorously and immediately placed in a constant temperature bath at 60° C. The rate of conversion of acrylonitrile to copolymer was followed by measuring the rate of decay of acrylonitrile absorption at 2.21 microns with a Beckman Model DK–2 spectrophotometer. By the conventional method, i.e., from the slope of a plot of the logarithm of acrylonitrile concentration versus time, the rate of conversion of acrylonitrile was found to be less than 0.5 hr.$^{-1}$.

An indication of the degree of copolymerization (or molecular weight of the resulting copolymer) was ob- ---
[1] Breslow, Hough, and Fairclough; J. Am. Chem. Soc. 76, 5361 (1954).

tained by measuring the viscosity of the copolymer solution. After four hours the solution was cooled to 25° C., and the viscosity was found to be from 1,000 to 2,000 poises. After an additional twenty-four hours, the viscosity was again measured and found to be unchanged from the 1,000 to 2,000 poise.

*Example 2*

Ethylenesulfonic acid was prepared according to the procedure of Example 1 excepting that the crude ethylenesulfonic acid was distilled under nitrogen at 137–141° C. and 2 mm. mercury absolute pressure.

Analysis of the distillate was as follows:

Percent purity by titration with base _____ 97.3
Percent purity by bromination of olefinic linkage ___ 96.1

The distillate was almost colorless but became light yellow in a few hours at room temperature. The yellowing was less rapid at −20° C., but was noticeable after a few days at this temperature.

When used, as in Example 1, in copolymerization with acrylonitrile, the rate of disappearance of acrylonitrile was found to be from 1.5 hr.$^{-1}$ to 2.0 hr.$^{-1}$. Viscosity of the resulting copolymer solution, however, was still between 1,000 and 2,000 poise.

*Example 3*

The crude ethylenesulfonic acid of Example 1 was decolorized with "Norite A" (an activated charcoal from the American Norit Company, Inc.) by stirring with the charcoal and filtering. After two such treatments, each with approximately 2% charcoal based on the weight of crude ethylenesulfonic acid, the acid was initially clear and colorless but darkened in a few days at room temperature. Use of this colorless acid in copolymerization with acrylonitrile, as in Example 1, led to rates less than 0.5 hr.$^{-1}$ and a viscosity of the product solutions of 500 to 2,000 poise.

*Example 4*

The procedure of Example 3 was repeated excepting the charcoal used was "Nuchar C–115A" (an activated vegetable carbon from the West Virginia Pulp and Paper Company). Results were almost identical to those obtained in Example 3.

*Example 5*

The crude ethylenesulfonic acid of Example 1 was treated with charcoal as in Example 3 and then distilled as in Example 2. The product obtained had the following analysis:

Percent purity by titration with base _____ 96.8
Percent purity by bromination of olefinic linkage __ 96.0

Although this analysis was very similar to that obtained on the distilled material in Example 2, there were several indications that material purified by the sequence of charcoal treatment and distillation lacked impurities which were present in the ethylenesulfonic acid not purified in this manner. Among other things, the purified product obtained from this sequence of treatments was not only colorless, but it remained colorless over an unusually long period of time. A comparison of the color stability of the ESA treated in these examples is as follows.

| Product from Example | Condition of Storage | Time for Initial Color Formation |
| --- | --- | --- |
| 5 | 25° C. under nitrogen | 4 weeks. |
| 5 | 25° C. under air | 3 weeks. |
| 5 | −20° C. air or nitrogen | >4 months. |
| 3 | 25° C. under nitrogen | <1 day. |
| 3 | −20° C. under nitrogen | 1–2 days. |
| 2 | 25° C. under nitrogen | <1 day. |
| 2 | −20° C. under nitrogen | <1 week. |

In addition to the significantly improved color stability of the ethylenesulfonic acid treated by the charcoal distillation sequence of Example 5, when the ethylenesulfonic acid was copolymerized with acrylonitrile as described in Example 1, rates of 2.5 to 3.1 hr.$^{-1}$ were obtained and the viscosity of the resulting copolymer solutions was from 7,500 to 13,600 poise, indicating considerably higher molecular weights than were obtained when any of the other treated ethylenesulfonic acids were employed. In this connection it is significant to note that the immediately foregoing polymerization rates of 2.5 to 3.1 hr.$^{-1}$ and viscosities of 7,500 to 13,600 poise are indistinguishable from those obtained when acrylonitrile is homopolymerized under the same conditions.

*Example 6*

In contrast, when the procedure of Example 5 is repeated excepting to carry out the treatment of the crude ethylenesulfonic acid in reverse order (i.e., first vacuum distill and then filter through activated charcoal) the color stability of the ESA is about equivalent to that observed from the vacuum distilled product of Example 2, and, when it is copolymerized with acrylonitrile, as in Example 1, rates less than about 0.5 hr.$^{-1}$ and solution viscosities of about 500 to 2,000 poise are obtained.

Any type of the commonly available activated charcoal or activated carbons that have been acid treated can be employed in the present method. The amount of charcoal used per unit weight of ESA is not particularly critical. Less time is usually required when larger amounts of the charcoal are employed, but when batch techniques are used separation and filtration may become burdensome. If desired, the mixing of the ESA with or filtering the ESA through the activated carbon or charcoal can be conducted at an elevated temperature. Generally, however, it is best to carry out the activated charcoal treatment at less than 40° C. and preferable at about 20–25° C. in order to avoid premature polymerization of the ESA. The treatment can be done either batchwise, wherein it may be desirable or necessary to treat the ESA two or more times with the activated charcoal, or, conveniently, and effectively by passing the ESA through a column packed with the activated charcoal.

Treating at atmospheric pressure is usually adequate. Higher pressures can be employed, but the purity of the resulting ESA is not notably influenced. Pressure differentials of several atmospheres are oftentimes beneficial in attaining desired flow rates through the filters for separating the ESA from the activated charcoal or for passing the ESA through the charcoal-packed column.

As a general rule, any conventional vacuum distillation technique and apparatus can be utilized in the distillation phase of the present treatment. Beneficially and advantageously, the distillation step is accomplished as rapidly as possible and at as low a temperature and pressure as practicable in order to minimize polymerization and discoloration of the ESA. Advantageously, a continuous distillation technique and apparatus arranged to allow a short contact time of the ESA with a hot surface is used, such as a falling film still. Although conditions up to about 180° C. at 20 mm. mercury absolute pressure can be used, preferably, the distillation is performed at about 100 to 140° C. at absolute pressures of from about 0.1 to about 2 mm. mercury. Adding an inhibitor, such as hydroquinine, to the distillation flask is often beneficial in minimizing loss of ESA through polymerization thereof during the distillation.

What is claimed is:

1. A method for purifying and stabilizing crude ethylenesulfonic acid comprising intimately contacting ethylenesulfonic acid in a liquid state with activated carbon; separating the ethylenesulfonic acid from the activated carbon; and, subsequently distilling the activated carbon-treated ethylenesulfonic acid at a reduced pressure and at a temperature below the normal boiling point of ethylenesulfonic acid, and recovering as distillate ethylenesulfonic acid of significantly reduced propensity to discolor upon aging.

2. The method of claim 1, wherein said contacting of the ethylenesulfonic acid with the activated carbon is carried out at a temperature between about 20° and 40° C.

3. The method of claim 1, wherein said distilling is carried out at between about 100° and 140° C. at an absolute pressure of from about 0.1 to about 2 millimeters mercury.

References Cited by the Examiner
UNITED STATES PATENTS 2,619,452 11/1952 Jones et al. _____ 260—79.3 XR
3,228,973 1/1966 O'Connor _____ 260—486

OTHER REFERENCES

Schildknecht, C. E.: Vinyl and Related Polymers, 1952 (New York), page 644.

LORRAINE A. WEINBERGER, *Primary Examiner.*

M. WEBSTER, *Assistant Examiner.*